SYSTEM FOR STORING AND RELEASING INFORMATION

Filed Jan. 6, 1954 3 Sheets-Sheet 1

INVENTORS
EDWARD S. WILSON
DONALD R. YOUNG
BY Davis Hoxie & Faithfull
ATTORNEYS

SYSTEM FOR STORING AND RELEASING INFORMATION

Filed Jan. 6, 1954 3 Sheets-Sheet 2

| ELEMENTS | E1 | E2 | E3 | E4 | E5 | E6 | ETC. |
|---|---|---|---|---|---|---|---|
| INITIAL CHARGE | — | — | — | — | — | — | |
| CHARGE AFTER SELECTIVE READ IN | — | + | + | — | + | — | |
| CHARGE AFTER READ OUT BY NEGATIVE PULSE | — | — | — | — | — | — | |
| OUTPUT PULSE | P1 | P2 | P2 | P1 | P2 | P1 | |

INVENTORS
EDWARD S. WILSON
DONALD R. YOUNG
BY
Davis, Hoxie & Faithfull
ATTORNEYS INVENTORS
EDWARD S. WILSON
DONALD R. YOUNG
BY
Davis, Hoxie & Faithfull
ATTORNEYS

United States Patent Office 2,885,656

Patented May 5, 1959

2,885,656

SYSTEM FOR STORING AND RELEASING INFORMATION

Edward S. Wilson and Donald R. Young, Poughkeepsie, N.Y., assignors to International Business Machines Corporation, New York, N.Y., a corporation of New York Application January 6, 1954, Serial No. 402,562

11 Claims. (Cl. 340—173)

This invention has to do with systems for the storage and release of information, as used in or in connection with high speed computing machines, tabulating machines, etc.; and in particular it provides an improved system for storing a number of binary items and for releasing them in rapid sequence.

Figure 1:
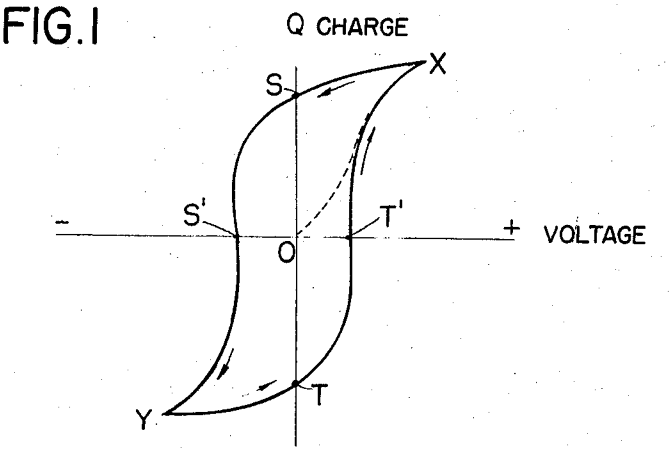
Figure 1 shows the hysteresis curve of a ferroelectric capacitor.

As the storage or "memory" element, the invention employs a cell or condenser in which the substance receiving the electrical charge has ferroelectric properties, such as those described in U.S. Patent No. 2,598,707. The characteristic of such a substance that is utilized for storage or "memory" is one which stems from its hysteresis effect, and is illustrated in Fig. 1. As there shown, a positive impressed voltage (abscissa) produces a peak charge X; but when the impressed voltage returns to zero, there is only a partial discharge, leaving a residual charge S which is retained even if the substance is short-circuited. Similarly, when a negative voltage is impressed, and then removed, there is first a peak charge Y followed by partial discharge to the residual value T, which is similarly retained. The rate of charge, partial discharge, and reversal of charge is very rapid.

These properties of rapid response, of retaining a residual charge and of having that charge either positive or negative make such a substance useful as a storage or "memory" element for a binary item read into it by selective control of the input polarity. The ability to "read out" the stored information stems from its capacity to yield different outputs depending on the way it has been charged, as now described.

Figure 2:
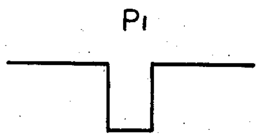
Figures 2 and 3 show different output pulses obtained from a ferroelectric cell.
Figure 3:
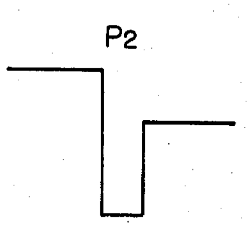

When a cell composed of this ferroelectric substance is suitably connected to an output circuit, the output voltage pulse obtained upon impressing a new charge differs in magnitude depending on whether or not the new charge is of the same or opposite polarity compared with the residual charge. This effect is illustrated in Figs. 2 and 3. Fig. 2 illustrates the effect when such a cell having a residual charge of one polarity (e.g., negative) receives a pulse of the same magnitude and polarity. The charge rises to the peak value (e.g., Y in Fig. 1) and then returns to the same retained value T. In such case there is a small net output pulse $P_1$. However, if the ferroelectric cell has a residual charge of opposite polarity (e.g. positive), and the same pulse previously described is impressed upon it, there is a larger net output pulse $P_2$, as shown in Fig. 3, because the charge goes from positive value S to the peak Y (Fig. 3) and then to the residual negative value T.

Assuming a ferroelectric cell already having a residual charge of given polarity, we store the information by either impressing a charging pulse of opposite polarity on the cell, to reverse the residual charge, or leaving the original residual charge, depending upon which alternative of a binary item is to be stored. In the latter case, the residual charge remains the same, whereas in the former case it becomes of opposite polarity; thus giving two different conditions of residual charge which permit the reading in and storage of either alternative of a binary item by pulsing the cell or leaving it with its original charge, in response to a source of binary information presenting either of two conditions. An example of such a source that is used throughout this description is the condition at an index point of a Hollerith card, wherein a hole represents one condition, recording one item, and the absence of a hole represents another condition recording another item, sometimes simply the negative or absence of the affirmative item recorded by a hole.

To "read out" the information thus stored, we feed to the ferroelectric cell a pulse of given polarity and take advantage of the above-described difference in output when the residual charge stored in the ferroelectric cell is at the same polarity as this pulsing "read-out" charge, as compared with the case wherein it is at the opposite polarity.

Figures 4, 5:
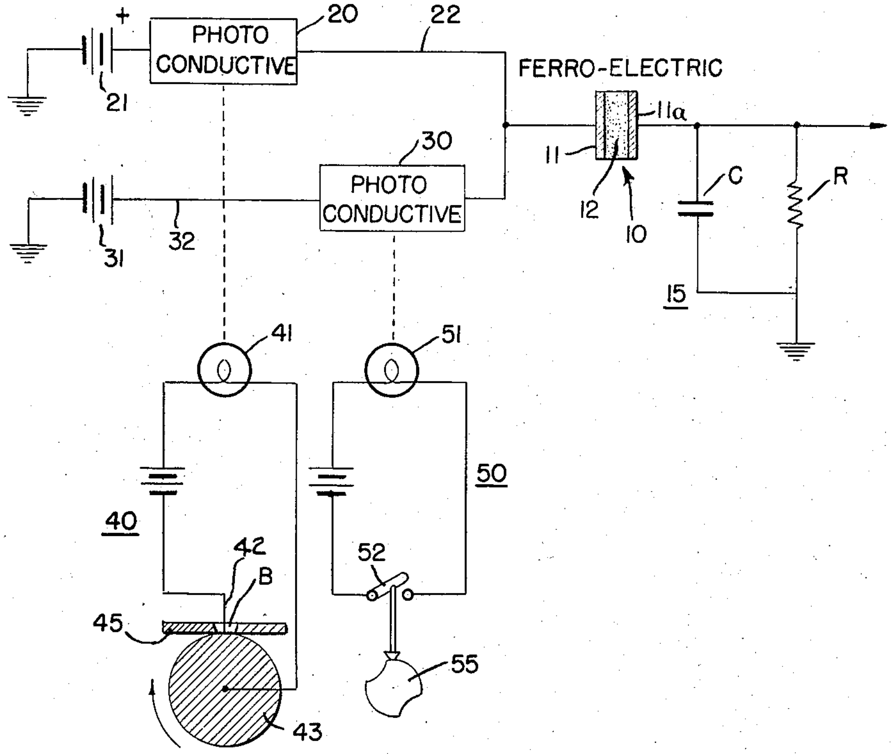
Figure 4 is a chart showing the states of a plurality of ferroelectric cells for the selective storage and "read-out" of binary information.
Figure 5 is a schematic diagram of the basic unit of the invention.

Thus, as illustrated in Fig. 4, if a number of such ferroelectric cells $E_1$ through $E_6$, all initially having residual charges of like polarity, have been selectively pulsed in accordance with a number of binary items so that some are of one charge and others are of opposite charge, the stored information thus represented can be read out serially by pulsing all of the several cells in sequence with the same polarity. Those cells at which the read-out pulse is of the same polarity as the residual charge will give an output pulse $P_1$, while those at which it is of the different polarity will give a larger output pulse $P_2$. It is noteworthy also that the end result of applying a pulse of one polarity to all of the cells alike is to leave them all with residual charges of like polarity, so that they are "cleared" and ready for selective activation to store in them a new group of binary items.

As will appear from the more detailed description below, the reading-in of items may be simultaneous, or sequential, or may be done by a combination of the simultaneous entry of some items and the sequential entry of others. The positional relation of the several ferroelectric units selectively acted upon in the reading-in step is established in a way to correspond with the order existing among the source items, and therefore preserves that order and permits reading-out in proper order.

In Fig. 5 we illustrate schematically the basic unit, which is duplicated as many times as may be needed in the full system described below. This basic unit comprises the ferroelectric cell 10, the output circuit 15, two switching elements 20, 30 (here shown as photoconductive cells) for the two input circuits of opposite polarity through which the ferroelectric cell is charged by either a positive or negative charge; and switch operators 40, 50 for the respective switching elements. These switch operators, as shown, include light sources 41 and 51 of the filament type for illuminating the respective switch cells 20 and 30, each light source having its separate energizing circuit, and controllers 45, 55 for the respective light circuits. The controllers are shown schematically to indicate simply the fact that the light 41 for reading-in is controlled in response to a binary (A—B) item, as by closing a light switch 42—43 under the action of a hole B in a Hollerith controller card 45 (condition B), or leaving the switch 42—43 open due to the absence of such a hole in the card (condition A); and to show that the light 51 used for reading-out is separately controlled by the controller 55.

The ferroelectric cell 10 is similar in construction to a conventional capacitor having two conducting plates 11, 11a between which is interposed a dielectric medium 12, the cell differing from the conventional capacitor in that its dielectric medium is a ferroelectric material such as Rochelle salts or barium titanate, that is, a material having a crystalline structure which exhibits ferroelectric properties similar to those of the materials described in U.S. Patent No. 2,598,707. In other words, the ferroelectric cell 10 has the properties previously described in connection with Fig. 1.

The photoconductive switches 20, 30 are of a known type employing a substance, such as lead sulphide, which is included in the circuit to be controlled and which has the property of decreasing rapidly and markedly in electrical resistance when subjected to light of proper intensity. The normal resistance is so high as to maintain in practical effect an open circuit, while the resistance upon exposure to light is so low as to give in practical effect a closed circuit capable of applying a charging current pulse to the ferroelectric cell 10. One switch 20 is in circuit with a source of energy of one polarity, say, positive (represented by terminal 21), while the other switch 30 is in circuit with a source of opposite polarity, i.e., negative in the case assumed (represented by terminal 31). As a standard of reference, we assume here and throughout that the ferroelectric cell 10 has already been charged negatively and has a residual negative charge. In such case, the switch 20 in the "positive" line 22 and its operator 40 serve as a read-in switching means. Lamp 41 of the switch operator 40 is in a supply circuit controlled by the two-position switch 42—43 which changes position in response to the prevalence of the one of two conditions representing a binary item of information, such as the existence or not of a hole B at a particular index point in a Hollerith card or controller 45. For condition A (e.g., no hole), the switch 42—43 is open due to the presence of the card 45 between contact arm 42 and the rotary drum 43 which the arm tends to engage as the other contact of the switch. If condition B exists (e.g., a hole at the index point) the switch 42—43 is closed momentarily to light lamp 41, thereby causing the photo-conductive element 20 to pass a pulse of positive current to the ferroelectric cell 10, with the result of reversing the polarity of its residual charge.

The information stored in the ferroelectric cell 10 is read out by closing switch 30 in the negative charging line 32, as by the action of the controller 55 in momentarily closing a switch 52 in the light circuit of switch operator 50, to make the switch cell 30 momentarily conductive. This causes a read-out pulse of negative polarity to be impressed upon the ferroelectric cell 10. If the polarity of the residual charge in ferroelectric cell 10 was not reversed by the previous read-in operation, so that this residual charge remained negative (condition A), then the negative read-out pulse will result in a small output pulse $P_1$ from the cell 10 to the output circuit 15 (Fig. 2). On the other hand, if the polarity of the residual charge in ferroelectric cell 10 was reversed by the previous read-in operation, so that this residual charge became positive (condition B), then the negative read-out pulse will result in a relatively large output pulse $P_2$ from the cell 10 (Fig. 3). In either case, at the conclusion of the read-out operation, the ferroelectric cell 10 will have a negative residual charge so that it is "cleared" and ready for the next read-in operation.

The output circuit 15, as shown, leads to ground through a resistor R in parallel with a capacitor C. This ground connection serves to complete the two charging circuits from the respective terminals 21 and 31. The function of the output circuit 15 is to develop a shaped pulse as a result of the flow of current through a ferroelectric cell 10, and to prevent any appreciable leakage current from flowing into the ferroelectric cells through the dark resistance of the photo-conductive cells 20—30. The resistor R serves to discharge the condenser C between pulses, and it is several times the value of the dark resistance of the photo-conductive cells 20—30, so as to minimize the leakage current through the ferroelectric cells 10. The maximum net change in voltage across the capacitance C will be obtained with a pulse output $P_2$ as shown in Fig. 3. The computing, tabulating or other apparatus (not shown) which is fed from the output of the ferroelectric cell 10, in the read-out operation, can be adjusted to respond to this maximum net change in voltage but not to the zero net change resulting from a pulse output $P_1$ (Fig. 2), or to respond differently in these two cases.

It will be understood that the photo-conductive cells 20, 30 should be shielded from light other than that from their respective activating sources or lamps 41, 51, as is customary in the use of such cells. The arrangement for this purpose may be conventional and therefore is not illustrated.

The basic method of operation can now be seen by considering two such basic units as are shown in Fig. 5. Both are first pulsed so that both ferroelectric cells 10 have a negative residual charge. One unit is made responsive to conditions at one point where a binary item of information exists; the other unit is responsive to conditions at another like point, for example, another index point on a Hollerith card. Assume now that condition A exists at one point and condition B at the other. In response to condition A, the lamp control switch 42—43 of the first unit remains open so its ferroelectric cell 10 remains negatively charged. In response to condition B prevailing at the other point, the lamp control switch 42—43 of the second unit is closed and a pulse of positive current is passed to its ferroelectric cell 10, causing it to become positively charged. The difference in residual charge on the two ferroelectric cells now "stores" the information represented by the difference in conditions at the two index points of the card.

To read-out the information thus stored in the two units, i.e., condition A in one unit and B in the other, a read-out lamp 51 serving the two units is energized twice in sequence, and its flashes are directed at the "negative" photo-conductive cell 30 of first one and then the other of the two units, causing negative pulses to be passed to their respective ferroelectric cells 10. The result is to reverse the polarity of the residual charge on cell 10 of the B unit and to leave the cell 10 of the A unit unchanged in polarity. The output from the A unit, which was already negative, is only the small output $P_1$ incident to the partial discharge occurring after the pulse, when the charge returns from its peak to its retained value. At the second or B unit, where the cell 10 was positive as a result of its response to condition B, the output $P_2$ resulting from the negative pulse is larger as shown in Fig. 3. The output resulting from the reading-out step is therefore a succession of pulses, first a weak pulse $P_1$ representative of condition A and then a strong pulse $P_2$ for condition B. The original information therefore now exists in serial form as a succession of pulses of different magnitudes, making it available for use or for storage by any system appropriately responsive to such a succession of pulses. The order in which the output pulses appear is in the same pattern as the order in which the items read-in appeared in their original sources, this order being preserved by the order in which the storage units are arranged and the coordination of the read-in and read-out steps with the original sources.

We have shown and prefer the use in each basic unit (Fig. 5) of two switches 20, 30 in the form of photo-conductive cells for the respective charging sources 21 and 31, each of these switches having its own operator 40 or 50. These switches may, of course, take other forms. Also, a single switch (such as the switch 20) may be used for both read-in and read-out, by simply reversing the polarity of the supply at the input terminal (21) when the read-out is to be effected; and a single lamp 41 can be used for both read-in and read-out. In this case, the read-in is effected as previously described; and the read-out can be effected, after reversing the polarity at terminal 21, by substituting the controller 55 and its associated switch 52 for the card-controlled switch 42—43, to pulse the lamp 41 of switch operator 40.

Furthermore, it is not essential to use two charging sources 21, 31 of opposite polarity. For example, in the above-described case where a single switch 20 is used in each basic unit for both read-in and read-out, assume that the read-out is effected without first reversing the polarity at terminal 21. The positive read-out pulse resulting from the momentary closing of switch 20 will then give a small output pulse $P_1$ from the ferroelectric cell 10 if the latter was in the B condition (with a residual charge of positive polarity) as a result of the read-in operation, because the charge in the ferroelectric cell 10 will merely increase from the point S (Fig. 1) to the point X and then return to point S. But if the ferroelectric cell 10 was left in the A condition (with a residual charge of negative polarity) as a result of the read-in operation, the momentary closing of switch 20 in the read-out operation will give a relatively large output pulse $P_2$ from the cell 10, since its charge will change from point T (Fig. 1) to point X and then to the point S. In other words, the stronger read-out pulse will now result from condition A and the weaker from condition B (which is the opposite of the case where the polarity at terminal 21 was reversed after the read-in operation and prior to the read-out operation). In this case, it is necessary to "clear" the ferroelectric cell 10 after each read-out (as by impressing a negative charge on it through switch 30), so that it will have a negative residual charge ready for the next read-in.

Figure 6:
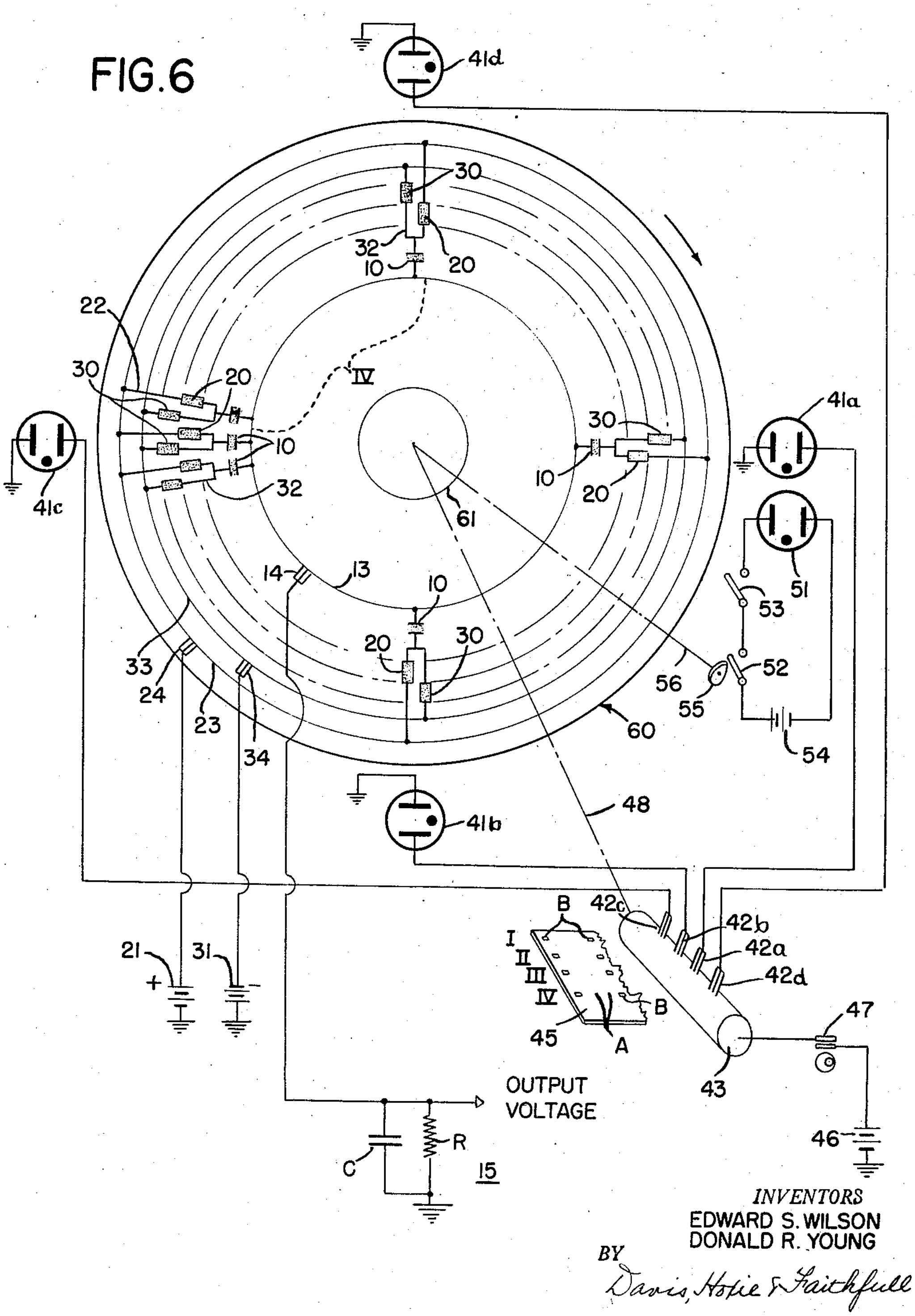
Figure 6 shows an embodiment of the invention for storage and release of a larger number of binary items.

Fig. 6 illustrates schematically a system for storage and release of a larger number of binary items. It is shown in terms of a unit (which may be a sub-assembly of a larger system) for dealing with the information contained on a 4 x 12 Hollerith card 45, i.e., one having four columns of twelve index points each, or a total of 48 items. Each point is capable of presenting two alternative conditions, a punch (B) or no-punch (A).

The system shown is one in which the information on such a card is read-in in twelve steps, at each of which an entry is made from each of the four columns of the card. That illustrates how simultaneous entries are made, and also how successive entries are made.

This illustrative system consists of these major parts, each of which is described in more detail below. There is a rotatable drum or disc 60 carrying 48 ferroelectric storage cells 10, each with its two photo-conductive switches 20, 30. (In the interest of simplification only a few of the basic units 10—20—30 are shown.) All are arranged in a circle about the drum axis, and each basic unit 10—20—30 is insulated from the others except for the connection of its two input terminals to slip rings 23 and 33, respectively, common to all units, and its output terminal to a slip ring 13 common to all units. The input slip rings 23 and 33 are for connecting the switches 20 and 30 through brushes 24 and 34 to the positive and negative charging sources 21 and 31, respectively. Adjacent the drum is a set of four read-in lamps $41^a$—$41^d$, each arranged to cooperate with the "positive" photo-conductive switching cells 20 of the twelve units in a particular quadrant. Each quadrant thus corresponds to a column on the card. There is a single read-out lamp 51 to cooperate with the "negative" photo-conductive cells 30 of all 48 units. Each read-in lamp 41 is so directed that, as the drum 60 rotates, the "positive" switching cells 20 of the twelve elements of its quadrant are passed successively through the path of its light beam. The read-out lamp 51 is so directed that upon a full rotation of the drum, the "negative" switching cells 30 of all 48 elements are passed in sequence through the path of its beam.

To effect reading-in, each of the four read-in lamps $41^a$—$41^d$ is energized selectively by a circuit including a current source 46, conducting roller 43 and one of four pick-up brushes $42^a$—$42^d$ past which the 4 x 12 card 45 is passed in timed relation to the quarter turn of the drum. Each brush 42 takes care of one column on the card and, by controlling the lamp 41 associated with one quadrant of the drum, controls the feed-in to twelve storage units in that quadrant in response to conditions at the twelve index points of its card column. The timing is such that as the twelve index points of the card pass the brush, switching cells 20 of the twelve storage units cross the path of the light beam from the corresponding lamp 41. Each lamp circuit is closed to cause a flash whenever a hole in the card, in the column associated with that brush, permits the brush 42 to come into contact with the roller 43 beneath. In that way, each hole or B condition causes a lamp 41 to flash on the switching cell 20 corresponding to that index point, which in turn causes a pulse of current to pass from positive terminal 21 via parts 24, 23 and 22 to this switch 20, which is now conductive, and thence through the corresponding ferroelectric cell 10 and parts 13, 14 to the output circuit 15. This effects a reversal of polarity of the residual charge in the corresponding ferroelectric cell 10. Each blank or A condition at any index point of the card leaves the lamp circuit open and therefore leaves its corresponding storage cell 10 unactivated, so that it retains its original residual charge.

To effect sequential reading-out, the reading-out lamp 51 is caused to flash intermittently in timed relation to the rotation of the drum 60, so that a flash occurs as the "negative" switching cell 30 of each storage unit in turn crosses the path of the light beam. Each unit in turn is therefore activated in that its ferroelectric cell 10 receives a negative pulse passing from terminal 31 via parts 34, 33 and 32 to its switching cell 30 as it is illuminated by lamp 51, and thence through its ferroelectric cell 10 and parts 13 and 14 to the output circuit 15. Since all these pulses are of the same polarity, the successive outputs differ in accordance with the differences in polarity of the residual charges resulting from the reading-in step.

While we have shown in Fig. 6 only a few of the basic units 10—20—30 to avoid the obscuring effect of showing all of them, it will be understood that in this illustrated embodiment there are forty-eight such units making up the four quadrants of twelve units each. Thus, we have shown in quadrant IV of the drum only the first unit (directly in line with the corresponding lamp $41^d$) and the twelfth unit, the other ten units being equally spaced between these two around the drum axis. The other three quadrants are similarly composed.

The drum 60 is made of an electrically non-conducting material and is mounted for rotation on its axis by means of a conventional constant-speed motor (not shown) connected to the drum shaft 61. The photo-conductive cells 20 and 30 are located on one end of the drum and may be applied thereto in the form of coatings of the light-sensitive material. The cells 20 are equally spaced in an annular area of the drum and are staggered with respect to the cells 30, which are similarly arranged on another annular area surrounding the first. The cells 20 and 30 are connected at their input sides through conductors 22 and 32 to the respective slip rings 23 and 33 on the drum, while the output sides of each pair of cells 20—30 are connected through the corresponding ferroelectric cell 10 to the slip ring 13. To make these connections between the cells and the slip rings, the well-known techniques employed for making printed circuitry may be used. As shown, the two charging circuits through the switching cells 20 and 30, respectively, are completed by grounding the output circuit 15 and the current sources supplying the terminals 21 and 31, respectively.

The four read-in lamps 41a—41d are stationary and are spaced equally about the drum axis. The light from each of these lamps is confined, as by a conventional optical system (not shown), to a narrow beam directed to the annular area occupied by the cells 20, so that the beam can illuminate only one of the cells 20 at a time as the drum rotates. The energizing circuits for these lamps include the respective brushes 42a—42d, their common conducting roller 43, a master switch 47 and the current source 46, these circuits being completed through ground. The roller 43 serves to feed the card 45 under the brushes 42 at a speed corresponding to the peripheral speed of the roller, and this peripheral speed is such that all twelve index points in each of the four columns of the card pass under the corresponding brush during one-quarter of a revolution of the drum 60. To obtain the proper synchronism, the roller 43 may be driven from the drum shaft 61 through a gear train shown schematically at 48. Each time the leading edge of a card is inserted under the brushes 42, preparatory to a read-in operation, the master switch 47 is cammed to its closed position to enable the reading-in lamp circuits to be closed through the punched holes B in the card; and as the lagging end of the card moves from under the brushes, the master switch is returned to its open position 5 to prevent energizing of these lamps.

The read-out lamp 51 is in a stationary position adjacent the drum 60. The light from this lamp is confined to a narrow beam directed to the annular area occupied by the cells 30, so that it can illuminate but one of these cells at a time. Its energizing circuit includes the intermittently operating switch 52, a master switch 53 and a current source 54. The switch 52 is controlled by a cam 55 driven from the drum shaft 61 through gearing 56. Each revolution of the cam closes the switch 52 momentarily; and the cam is rotated through one revolution for each $\frac{1}{48}$ of a revolution of drum 60. Therefore, with the master switch 53 closed, the lamp 51 will be flashed each time a cell 30 is moved into the path of its light beam as the drum 60 rotates. At the start of the read-out operation, the drum is positioned so that the first cell 30 of one of the quadrants has not quite reached the path of the light from lamp 51. When the master switch 53 is then closed and the drum rotated, the cells 30 of that quadrant will be illuminated in sequence to provide the output pulses as previously described. Rotation of the drum through a complete revolution will read out all of the stored information sequentially.

It will be apparent that in the illustrated form of the invention the ferroelectric cells 10 are selectively charged, according to the information to be stored, by a read-in switching means comprising a pulsing device 41 controlled by the movable member 43 in conjunction with the punched card 45 and contacts 42, circuitry including a switching element 20 operable by the pulsing device 41 for connecting each cell 10 in circuit with the positive charging source 21, and mechanism including the rotating drum 60 synchronized with the movable member 43 for bringing the cells 10 one-by-one under control of the pulsing device 41 through the switching element 20. The stored information is released by a read-out pulsing means comprising the pulsing device 51 operated periodically by the movable member 55 synchronized with the drum, and circuitry including a switching element 30 operable by the pulsing device 51 for connecting each cell 10 in circuit with the negative charging source 31, the same drum mechanism serving to bring the cells 10 one-by-one under control of the pulsing device 51 through the switching element 30.

It will be evident that various other physical arrangements are possible for effecting the reading-in and reading-out of information, and that sources other than a Hollerith card may be used with appropriately different responsive means for selectively operating the circuit controllers of the several ferroelectric units. For example, in the same case of reading-in information from a Hollerith card, the storage units can be arranged on a flat rectangular mounting panel in the pattern of the index points of the card itself, and then by direct super-position the punched holes can serve to admit light selectively to the corresponding and registering photo-conductive controllers of the storage units that are to store the information (condition B) represented by the holes in the card, while at all points not punched, the card excludes light from all other photo-conductive controllers so that their ferroelectric cells 10 retain their original charge and become representative of the A condition. A number of panels, each adapted to receive a superposed card, can be included in a single mounting means. For reading-out, the mounting means can either be made to traverse a series of rectilinear paths crossing the beam of a read-out lamp, or the beam can be caused to traverse the storage units in proper sequence to cause the requisite "negative" pulse to be applied to each ferroelectric element in turn.

In any case, the read-in and read-out pulses can be applied through other means than photo-conductive switches individual to each ferroelectric element. One alternative is to connect each ferroelectric element to a segment of a commutator or distributor (rectilinear or circular) over which a circuit closing element can be passed to close in turn the circuit including each ferroelectric element. One alternative is to connect each ferroelectric element to a segment of a commutator or distributor (rectilinear or circular) over which a circuit closing element can be passed to close in turn the circuit including each ferroelectric element. We prefer the use of photo-conductive controllers because of the rapidity of action and relative freedom from reliance on moving parts. The chief advantage of the alternative mentioned is that it eliminates one photo-conductive switch at each storage unit and thereby conserves space, permitting more units to be mounted in a given space. The same conservation of space can be accomplished also by utilizing the same switch for both read-in and read-out, by reversing the polarity of the current supplied to the input circuits of the several units, causing it to be positive for read-in and negative for read-out in the case where the initial residual charges are all negative.

In cases where the mounting means for the storage units is rotary, the units may be mounted on the cylindrical periphery rather than on the flat end as shown here for purposes of illustration; and by using a cylinder of sufficient length, a number of circles of units may be had, each for storing a particular series of items, as for example, the series on a particular card. To conserve superficial space in the use of the cylindrical surface, the components of each unit may if desired be arranged in depth rather than wholly on the surface. For example, the photo-conductive element or elements alone can be on the surface and the ferroelectric element and output circuit components can be located interiorly, as on the inner wall of a hollow cylinder having radial spokes or spiders. By appropriate switching arrangements, a single set of output circuit components (C—R) can serve a number of circular sets of storage units, since the several sets of units are read-out sequentially.

Other variants of the physical means are possible in different embodiments of the basic unit and the system as defined in the following claims.

We claim:

1. A system for storing and releasing information comprising a plurality of ferroelectric cells, an electrical charging source of given polarity, read-in switching means for connecting said source to and then disconnecting it from selected cells corresponding to the information to be stored, to impress upon the selected cells a charging voltage of said polarity, read-out means including an electrical charging source, a pulsing device, circuitry including a switching element operable by said pulsing device for connecting each cell in circuit with said last source, mechanism for bringing the cells one-by-one in predetermined sequence under control of the pulsing device through said switching element, and a movable member synchronized with said mechanism for operating the pulsing device periodically, said read-out means being operable to impress electrical pulses upon all the cells in sequence, and an out-put terminal connected to receive from each cell a pulse resulting from operation of the read-out pulsing means.

2. A system for storing and releasing information comprising a plurality of ferroelectric cells, a pair of electrical charging sources having opposite polarities, read-in switching means for connecting one of said sources to and then disconnecting it from selected cells corresponding to the information to be stored, to impress upon the selected cells a charging voltage of one polarity, said read-in switching means comprising a pulsing device having a movable member for operating it at predetermined intervals according to the information to be stored, circuitry including a switching element operable by the pulsing device for connecting each cell in circuit with the first charging source of said one polarity, and mechanism synchronized with said movable member for bringing the cells one-by-one under control of the pulsing device through said switching element, read-out switching means including said mechanism for connecting the other source sequentially to and disconnecting it from the cells to impress thereon a voltage opposite in polarity to the charging voltage, and an out-put terminal connected to receive from each cell a pulse resulting from operation of the read-out switching means.

3. A system according to claim 2, in which the read-out switching means comprises a second pulsing device, circuitry including a second switching element operable by said last pulsing device for connecting each cell in circuit with the charging source of opposite polarity, said mechanism being operable to bring the cells one-by-one under control of the second pulsing device through the second switching element, and a movable member synchronized with said mechanism for operating the second pulsing device periodically.

4. A system for storing and releasing information comprising a plurality of ferroelectric cells, a pair of electrical charging sources having opposite polarities, read-in switching means for connecting one of said sources to and then disconnecting it from selected cells corresponding to the information to be stored, to impress upon the selected cells a charging voltage of one polarity, said read-in switching means comprising photoconductive elements for connecting the respective cells to said one source, a lamp and an energizing circuit therefor, a movable member for energizing the lamp circuit at predetermined intervals according to the information to be stored, and mechanism synchronized with said movable member for bringing the photoconductive elements one-by-one into operative relation to the lamp, read-out switching means for connecting the other source sequentially to and disconnecting it from the cells to impress thereon a voltage opposite in polarity to the charging voltage, and an out-put terminal connected to receive from each cell a pulse resulting from operation of the read-out switching means.

5. A system according to claim 4, in which the read-out switching means comprise photoconductive elements for connecting the respective cells to said other source, a lamp and a energizing circuit therefor, said synchronized mechanism being operable to bring said last photoconductive elements one-by-one into operative relation to said last lamp, and a movable member synchronized with said mechanism for energizing said last lamp circuit periodically.

6. A system for storing and releasing information comprising a plurality of pairs of spaced photoconductive elements, a plurality of ferroelectric cells each of which is electrically connected to both photoconductive elements of one of said pairs, a first element of each pair of conductive elements being connected to impress a voltage of one polarity upon the respective ferroelectric cell and the second element of each pair being connected to impress a voltage of the opposite polarity thereupon, means for illuminating selected ones of said first elements in a pattern corresponding to the information to be stored, to make the selected elements conductive and thereby impress said first voltage upon the correlated ferroelectric cells, means for sequentially illuminating the second elements to impress said voltage of opposite polarity upon the ferroelectric cells, and an output terminal connected to receive from each cell a pulse resulting from operation of said sequential illuminating means.

7. A system for storing and releasing information comprising a rotatable drum having a plurality of pairs of spaced photoconductive elements disposed in two sets upon the drum and positioned so that loci of the respective sets of elements are circles whose axes correspond with the axis of rotation of the drum, each pair consisting of an element from each set, a plurality of ferroelectric cells also carried by the drum and each electrically connected to both photoconductive cells of a respective pair, the photoconductive elements of one set being connected to impress a voltage of one polarity upon the respective ferroelectric cells and the elements of the other set being connected to impress a voltage of the opposite polarity thereupon, a read-in light source having an energizing circuit, a member movable in synchronism with the drum for controlling the light circuit to flash the light source at predetermined positions of the drum according to the information to be stored, the light source being positioned to illuminate the photoconductive elements of one set in sequence as the drum is rotated, whereby said last elements corresponding to said predetermined positions are made conductive to impress a voltage of said one polarity upon the correlated ferroelectric cells, a read-out light source for sequentially illuminating the photoconductive elements of the other set to impress a voltage of said opposite polarity upon the ferroelectric cells, and an output terminal connected to receive from each cell a pulse resulting from operation of the read-out light source.

8. A system according to claim 7, in which the read-out light source is stationary, and comprising also a movable member synchronized with the rotation of the drum for flashing the read-out light source to illuminate the elements of said other set sequentially as the drum rotates.

9. A system for storing information represented by the presence or absence of indicia at index positions on a recording element, which comprises a record reading device including a reading switch and a movable member for causing the switch to scan the index positions on said element, the switch being operable by the presence of indicia at any of the index positions, a plurality of ferroelectric cells having residual charges of the same polarity, a current source of opposite polarity, mechanism synchronized with the movable member for bringing the cells in sequence under control of the reading switch as said switch scans the index positions, the switch thereby controlling a different cell for each index position, and means responsive to operation of the switch at any index position for connecting the corresponding cell to said current source, whereby the cells corresponding to the index positions having said indicia acquire a residual charge of said opposite polarity.

10. A system for storing and releasing information represented by the presence or absence of indicia at index positions on a card, the index positions being arranged in columns, which comprises a rotatable drum having a plurality of pairs of spaced photoconductive elements arranged as two concentric sets each of which includes one element from each pair, the sets being divided into sectors corresponding in number to the number of columns on the card, the pairs of elements in each sector corresponding in number to the number of index positions in the respective column of the card, a plurality of ferroelectric cells carried by the drum and each electrically connected to both photoconductive elements of a respective pair, the photoconductive elements of one set being connected to impress a voltage of one polarity upon the respective ferroelectric cells and the elements of the other set being connected to impress a voltage of the opposite polarity thereupon, a plurality of read-in light sources corresponding in number to the number of sectors and each positioned to illuminate in sequence the elements of one set in the corresponding sector as the drum rotates, a card reading device including reading switches for the respective columns and a movable member synchronized with the rotation of the drum for causing the switches to scan their corresponding columns on the card, each switch being operable by said indicia at any index position in the respective column, a flashing circuit for each light source including one of the reading switches, whereby the elements of said one set in each sector are illuminated in a pattern corresponding to that of indicia at the index positions of the respective column, by movement of said member and drum, to impress a voltage of said one polarity upon the cells corresponding to the illuminated elements, operable to illuminate in sequence the photoconductive elements of the other set as the drum rotates, to impress a voltage of said opposite polarity upon the ferroelectric cells, and an output terminal connected to receive from each cell a pulse resulting from operation of the read-out light source.

11. A system according to claim 10, comprising also electrical charging sources of opposite polarity, slip rings on the drum connected to respective sets of the photoconductive elements, brushes engaging the rings and connected to the respective charging sources, an output slip ring connected to the ferroelectric cells, and a brush engaging said last ring and connected to the output terminal.

References Cited in the file of this patent

UNITED STATES PATENTS

| | | |
|---|---|---|
| 2,382,251 | Parker et al. | Aug. 14, 1945 |
| 2,614,167 | Kamm | Oct. 14, 1952 |
| 2,679,644 | Lippel et al. | May 25, 1954 |
| 2,750,580 | Rabenda et al. | June 12, 1956 |
| 2,774,429 | Rabenda | Dec. 12, 1956 |

OTHER REFERENCES

"Ferroelectrics for Digital Information Storage and Switching" Buck M.I.T. Thesis Report, published June 5, 1952.